(12) United States Patent
Yi et al.

(10) Patent No.: US 12,722,993 B2
(45) Date of Patent: Sep. 1, 2026

(54) APPARATUS AND METHOD FOR TREATING WASTE WATER

(71) Applicant: Samsung Electronics Co., Ltd., Suwon-si (KR)

(72) Inventors: Jongkeun Yi, Suwon-si (KR); Jehun Kim, Suwon-si (KR); Suhyoung Cho, Suwon-si (KR); Jiwon Chun, Suwon-si (KR); Junyul Hur, Suwon-si (KR); Jaedong Hwang, Seoul (KR); Daesoo Park, Seoul (KR); Jaehyung Park, Seoul (KR); Seungjoon Chung, Seoul (KR); Yongxun Jin, Seoul (KR); Jaehoon Choi, Seoul (KR); Seokhwan Hong, Seoul (KR)

(73) Assignees: SAMSUNG ELECTRONICS CO., LTD., Suwon-si (KR); SAMSUNG E&A CO., LTD., Seoul (KR)

( * ) Notice: Subject to any disclaimer, the term of this patent is extended or adjusted under 35 U.S.C. 154(b) by 599 days.

(21) Appl. No.: 18/200,615

(22) Filed: May 23, 2023

(65) Prior Publication Data

US 2024/0051859 A1 Feb. 15, 2024

(30) Foreign Application Priority Data

Aug. 11, 2022 (KR) ........................ 10-2022-0100279

(51) Int. Cl.
*C02F 9/00* (2023.01)
*C02F 1/00* (2023.01)
(Continued)

(52) U.S. Cl.
CPC .............. *C02F 9/00* (2013.01); *C02F 1/5209* (2013.01); *C02F 2001/007* (2013.01);
(Continued)

(58) Field of Classification Search
CPC ........ C02F 9/00; C02F 1/5209; C02F 1/5245; C02F 1/56; C02F 1/66; C02F 3/303;
(Continued)

(56) References Cited

U.S. PATENT DOCUMENTS 8,545,700 B1 10/2013 Stroot et al.
2019/0352206 A1* 11/2019 Biagini .................... C02F 9/00
2021/0206679 A1 7/2021 Chung et al.

FOREIGN PATENT DOCUMENTS

JP 2003311279 A * 11/2003
JP 4142994 B2 * 9/2008
(Continued)

OTHER PUBLICATIONS

Translation of Kitagawa (Year: 2003).*
Translation of Takeda (Year: 2008).*
Translation of Lee (Year: 2016).*

*Primary Examiner* — Ekandra S. Miller-Cruz
(74) *Attorney, Agent, or Firm* — Muir Patent Law, PLLC

(57) ABSTRACT

An apparatus for treating waste water including: a first flocculation tank to which a first flocculant is provided to produce a first flocculated material in which fluorine in waste water introduced from a waste water storage part is coagulated; a second flocculation tank to which a second flocculant and carbon dioxide are provided to produce a second flocculated material in which the first flocculated material and residual fluorine in first outflow water introduced from the first flocculation tank are flocculated; a third flocculation tank to which a third flocculant is provided to produce a third flocculated material in which the first flocculated material and the second flocculated material in second outflow water introduced from the second flocculation tank are flocculated; a first sedimentation tank in which third outflow water introduced from the third flocculation tank is solid-liquid separated into first sludge containing the
(Continued)

third flocculated material and first supernatant water; a nitrification tank in which alkalinity is provided by a carbonate supplied from the carbon dioxide, and ammoniacal nitrogen in the first supernatant water introduced from the first sedimentation tank is oxidized by nitrifying microorganisms; and a second sedimentation tank in which fourth outflow water introduced from the nitrification tank is solid-liquid separated into second sludge and second supernatant water.

19 Claims, 10 Drawing Sheets

(51) Int. Cl.

| | |
|---|---|
| ***C02F 1/52*** | (2023.01) |
| ***C02F 1/56*** | (2023.01) |
| ***C02F 1/66*** | (2023.01) |
| ***C02F 3/30*** | (2023.01) |
| ***C02F 101/14*** | (2006.01) |
| ***C02F 101/16*** | (2006.01) |

(52) U.S. Cl.
CPC .............. *C02F 1/5245* (2013.01); *C02F 1/56* (2013.01); *C02F 1/66* (2013.01); *C02F 3/303* (2013.01); *C02F 3/305* (2013.01); *C02F 2101/14* (2013.01); *C02F 2101/16* (2013.01); *C02F 2301/08* (2013.01)

(58) Field of Classification Search
CPC C02F 3/305; C02F 2001/007; C02F 2101/14; C02F 2101/16; C02F 2301/08; C02F 2103/346; C02F 3/1215; C02F 1/5236; C02F 1/583; C02F 3/006; C02F 2209/06; C02F 2209/07
USPC .......................................................... 210/620
See application file for complete search history.

(56) References Cited

FOREIGN PATENT DOCUMENTS

| | | | | | |
|---|---|---|---|---|---|
| KR | 100281026 B1 | | 2/2001 | | |
| KR | 100430578 B1 | | 5/2004 | | |
| KR | 1020070059657 A | | 6/2007 | | |
| KR | 20160043322 A | * | 4/2016 | ................ | C02F 9/00 |
| KR | 11020160081383 A | | 7/2016 | | |
| KR | 101881995 B1 | | 8/2018 | | |
| KR | 102067164 B1 | | 1/2020 | | |
| KR | 1020200065129 A | | 6/2020 | | |

* cited by examiner

APPARATUS AND METHOD FOR TREATING WASTE WATER

CROSS-REFERENCE TO RELATED APPLICATION(S)

This application claims benefit of priority to Korean Patent Application No. 10-2022-0100279 filed on Aug. 11, 2022 in the Korean Intellectual Property Office, the disclosure of which is incorporated herein by reference in its entirety.

BACKGROUND

1. Field

The present disclosure relates to an apparatus and a method for treating waste water.

2. Description of Related Art

A large amount of waste water containing fluorine, nitrogen, and the like is produced in many industrial fields such as the semiconductor industry, the metal industry, the fertilizer industry, and the pesticide manufacturing industry. Chemicals dosed for treating waste water cause corrosion of a treatment apparatus, scale formation, ecotoxicity, or environmental contamination. Therefore, study and development for an environmentally friendly method for treating waste water are demanded.

SUMMARY

An aspect of the present disclosure may provide an apparatus and a method for treating waste water, having reduced usage of hazardous chemicals.

According to an aspect of the present disclosure, an apparatus for treating waste water may include: a first flocculation tank to which a first flocculant is provided to produce a first flocculated material in which fluorine in waste water introduced from a waste water storage part is coagulated; a second flocculation tank to which a second flocculant and carbon dioxide are provided to produce a second flocculated material in which the first flocculated material and residual fluorine in first outflow water introduced from the first flocculation tank are flocculated; a third flocculation tank to which a third flocculant is provided to produce a third flocculated material in which the first flocculated material and the second flocculated material in second outflow water introduced from the second flocculation tank are flocculated; a first sedimentation tank in which third outflow water introduced from the third flocculation tank is solid-liquid separated into first sludge containing the third flocculated material and first supernatant water; a nitrification tank in which alkalinity is provided by a carbonate supplied from the carbon dioxide, and ammoniacal nitrogen in the first supernatant water introduced from the first sedimentation tank is oxidized by nitrifying microorganisms; and a second sedimentation tank in which fourth outflow water introduced from the nitrification tank is solid-liquid separated into second sludge and second supernatant water.

According to another aspect of the present disclosure, an apparatus for treating waste water may include: a first flocculation tank in which a water-insoluble calcium salt in which fluorine in waste water introduced from a waste water storage part is coagulated is produced; a second flocculation tank to which carbon dioxide for adjusting a pH of first outflow water introduced from the first flocculation tank is provided; a third flocculation tank in which floc in which the water-insoluble calcium salt in second outflow water introduced from the second flocculation tank is flocculated is produced; a first sedimentation tank in which third outflow water introduced from the third flocculation tank is solid-liquid separated into first sludge containing the floc and first supernatant water; a nitrification tank in which ammoniacal nitrogen in the first supernatant water introduced from the first sedimentation tank is oxidized, while an alkaline material for providing alkalinity is not provided; and a second sedimentation tank in which fourth outflow water introduced from the nitrification tank is solid-liquid separated into second sludge and second supernatant water.

According to still another aspect of the present disclosure, a method for treating waste water may include: producing a first flocculated material in which fluorine in waste water is coagulated in a first flocculation tank; producing a second flocculated material in which residual fluorine in first outflow water introduced from the first flocculation tank is flocculated in a second flocculation tank and dosing carbon dioxide to the second flocculation tank to adjust a pH; producing a third flocculated material in which the first flocculated material and the second flocculated material in second outflow water introduced from the second flocculation tank are flocculated, in a third flocculation tank; solid-liquid separating third outflow water introduced from the third flocculation tank into first sludge containing the third flocculated material and first supernatant water in a first sedimentation tank; oxidizing ammoniacal nitrogen in the first supernatant water introduced from the first sedimentation tank, in a nitrification tank, while alkalinity is provided by the carbon dioxide dosed in the adjusting of pH; and solid-liquid separating fourth outflow water introduced from the nitrification tank into second sludge and second supernatant water in the second sedimentation tank.

BRIEF DESCRIPTION OF DRAWINGS

The above and other aspects, features and other advantages of the present disclosure will be more clearly understood from the following detailed description taken in conjunction with the accompanying drawings, in which.

DETAILED DESCRIPTION

Hereinafter, exemplary embodiments in the present disclosure will now be described in detail with reference to the accompanying drawings.

Figure 1:
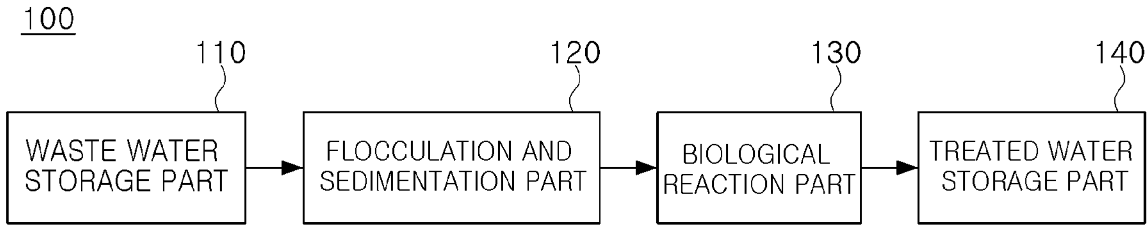
FIG. 1 is a drawing schematically illustrating an apparatus for treating waste water according to an exemplary embodiment in the present disclosure.
Figure 2:
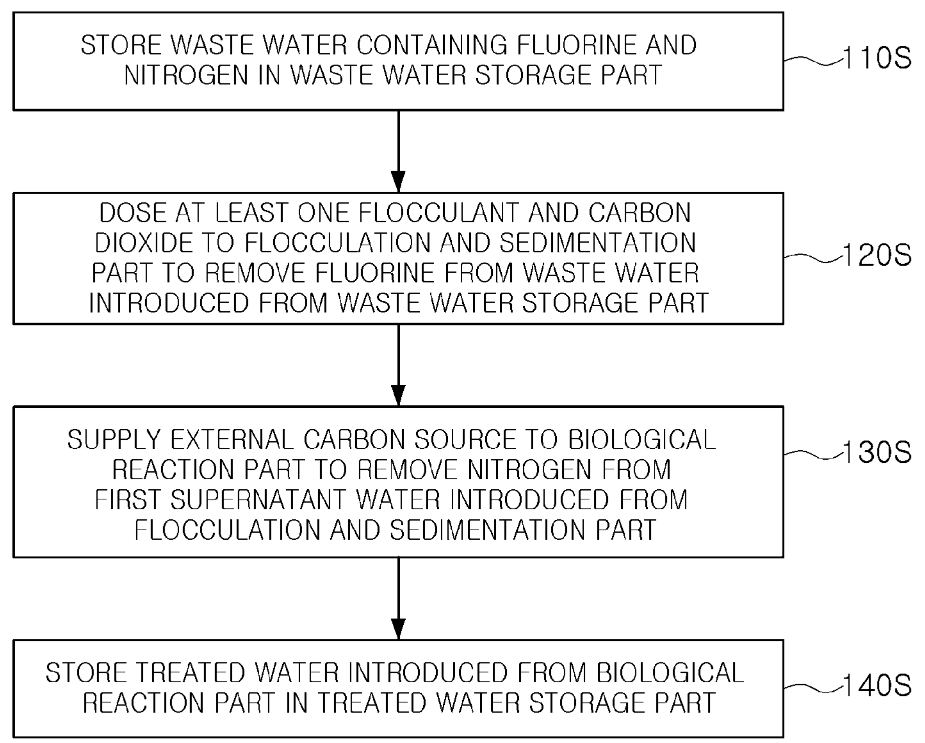
FIG. 2 is a flow chart schematically illustrating a method for treating waste water using the apparatus for treating waste water of FIG. 1.

FIG. 1 is a drawing schematically illustrating an apparatus for treating waste water 100 according to an exemplary embodiment in the present disclosure, and FIG. 2 is a flow chart schematically illustrating a method for treating waste water (100S) using the apparatus for treating waste water 100 of FIG. 1.

Referring to FIGS. 1 and 2, the apparatus for treating waste water 100 of an exemplary embodiment may include: a waste water storage part 110, a flocculation and sedimentation part 120, a biological reaction part 130, and a treated water storage part 140.

The method for treating waste water (100S) of an exemplary embodiment may include: storing waste water containing fluorine and nitrogen in a waste water storage part 110 (110S), dosing at least one flocculant and carbon dioxide to a flocculation and sedimentation part 120 to remove fluorine from waste water introduced from the waste water storage part 110 (120S), supplying an external carbon source to a biological reaction part 130 to remove nitrogen from first supernatant water introduced from the flocculation and sedimentation part 120 (130S), and storing treated water introduced from the biological reaction part 130 in a treated water storage part 140 (140S).

The present disclosure may provide an apparatus for treating waste water 100 and a method for treating waste water (100S), which reduce the usage of hazardous chemicals and are environmentally friendly, by being provided with alkalinity required for the biological reaction part 130 from carbon dioxide dosed to the flocculation and sedimentation part 120.

In the waste water storage part 110, waste water produced in the fields such as semiconductor industry, metal industry, fertilizer industry, and pesticide manufacturing industry may be stored. The waste water may be waste water including nitrogen and fluorine components in a high concentration. For example, the waste water may be waste water produced from a diffusion process using fluorine during a semiconductor manufacturing process, or an etching or cleaning process using hydrofluoric acid (HF) and ammonia water ($NH_4OH$). The waste water may include hydrofluoric acid, sulfuric acid, hydrochloric acid, phosphoric acid, and the like, and may be acid waste water of a pH about 4 or less. The waste water may include various components such as metal materials, semiconductor materials, inorganic compounds, and metal oxides, in addition to fluorine and nitrogen.

In the flocculation and sedimentation part 120, pollutants in waste water (for example, fluorine) may be separated using a flocculant. To the flocculation and sedimentation part 120, a flocculant which flocculates a fluorine component in waste water and a pH adjusting material for adjusting pH may be dosed. In the present disclosure, liquefied or vaporized carbon dioxide may be dosed as a pH adjusting material to reduce the usage of sulfuric acid, hydrochloric acid, and the like as the pH adjusting material. When $CO_2$ dissolves in water to produce aqueous $CO_2$ it also forms carbonic acid ($H_2CO_3$) which dissociates to produce bicarbonate ions ($HCO_3^-$), which in turn can also dissociate into carbonate ions ($CO_3^{2-}$), and which dissociation reactions also produce protons ($H^+$) which therefore lower the pH of the solution. It is also envisioned to add carbonic acid instead of (or in addition to) $CO_2$. The pH adjusting material can be one that consists of carbon and oxygen (or hydrogen, carbon and oxygen) and where the pH adjusting material does not include any, or substantially any hazardous inorganic acids. In addition, carbon dioxide dosed as the pH adjusting material forms a carbonate and the like in the process of being dissolved in water, which provides alkalinity to a subsequent biological reaction part 130, and thus, the use of a hazardous material such as caustic soda (NaOH) may be excluded.

In the biological reaction part 130, organic materials, SS, nitrogen, and the like in waste water may be removed using microorganisms. In the biological reaction part 130, a reduction reaction of nitrate nitrogen and a nitrification reaction of ammoniacal nitrogen may be performed. To the biological reaction part 130, an external carbon source required for the reduction reaction of nitrate nitrogen may be dosed. In the present disclosure, a carbonate is provided from carbon dioxide dosed to the flocculation and sedimentation part 120, thereby excluding the use of caustic soda for providing alkalinity to the biological reaction part 130.

In a treated water storage part 140, treated water from which fluorine, nitrogen, and the like have been removed may be stored. The treated water may have a fluorine concentration in a range of about 30 mg/L or less, for example, about 1 mg/L to about 30 mg/L, about 1 mg/L to about 25 mg/L, or about 10 mg/L to about 30 mg/L, and a total nitrogen (T-N) concentration in a range of about 40 mg/L or less, for example, about 1 mg/L to about 40 mg/L, about 10 mg/L to about 40 mg/L, or about 1 mg/L to about 35 mg/L. However, the fluorine concentration and the total nitrogen concentration in the treated water stored in the treated water storage part 140 are not limited to the numerical range described above, and it may be understood that the treatment water has the fluorine concentration and the total nitrogen concentration substantially in a similar level to those of the treated water purified using sulfuric acid, caustic soda, and the like.

Hereinafter, referring to FIGS. 3 and 4, the flocculation and sedimentation part 120 according to an exemplary embodiment in the present disclosure and a fluorine treatment process using the same will be described in more detail.

Figure 3:
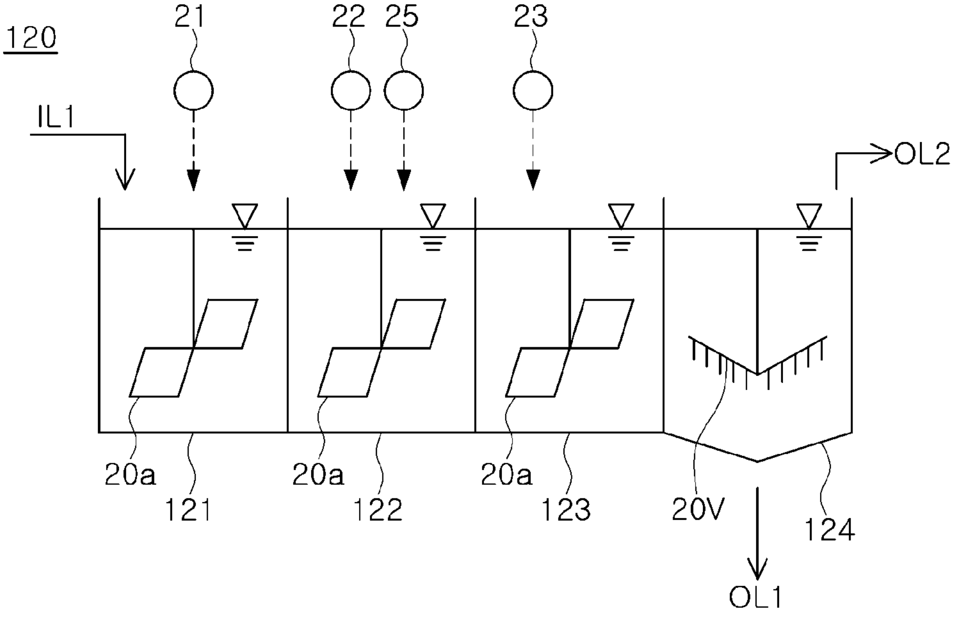
FIG. 3 is a drawing schematically illustrating the flocculation and sedimentation part according to an exemplary embodiment in the present disclosure.
Figure 4:
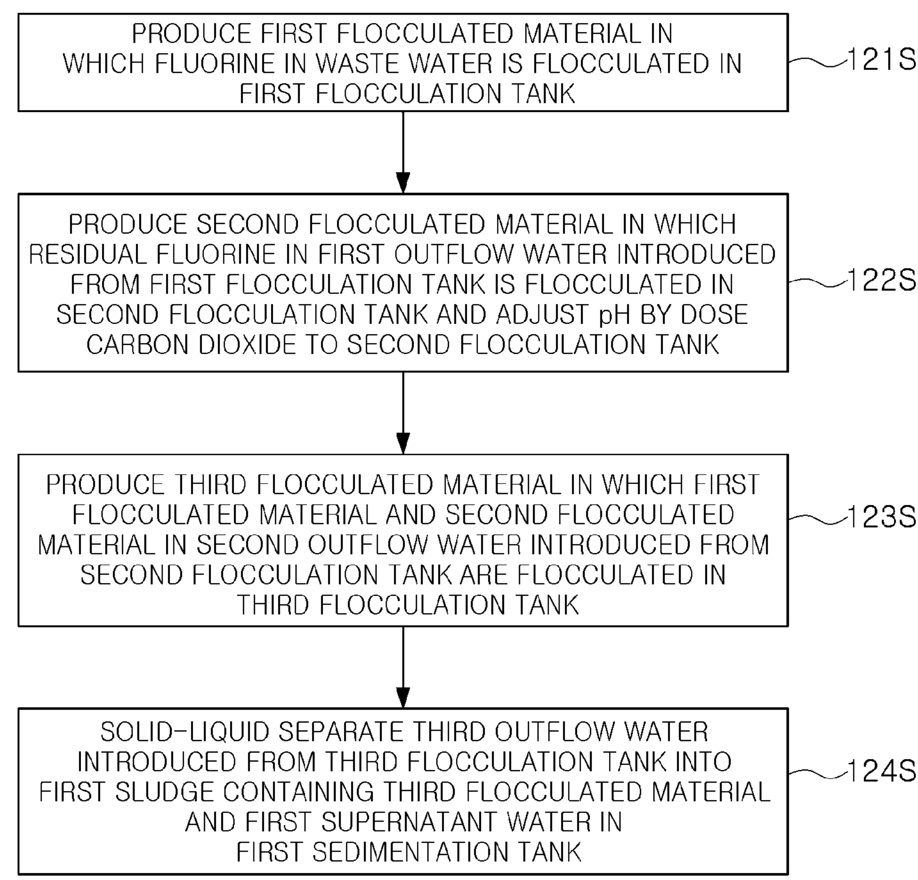
FIG. 4 is a flow chart schematically illustrating a waste water treatment process using the flocculation and sedimentation part of FIG. 3.

FIG. 3 is a drawing schematically illustrating the flocculation and sedimentation part 120 according to an exemplary embodiment in the present disclosure, and FIG. 4 is a flow chart schematically illustrating a waste water treatment process 120S using the flocculation and sedimentation part 120 of FIG. 3.

Referring to FIGS. 3 and 4, the flocculation and sedimentation part 120 of an exemplary embodiment in the present disclosure may include a first flocculation tank 121, a second flocculation tank 122, a third flocculation tank 123, and a first sedimentation tank 124. According to an exemplary embodiment, in the first flocculation tank 121, the second flocculation tank 122, and the third flocculation tank 123, an agitator 20*a* is provided, and in the first sedimentation tank 124, a sludge collector 20*b* may be provided.

In addition, the waste water treatment process 120S using the flocculation and sedimentation part 120 of an exemplary embodiment may include: producing a first flocculated material in which fluorine in waste water is coagulated in the first flocculation tank 121 (121S); producing a second flocculated material in which residual fluorine in first outflow water introduced from the first flocculation tank 121 is flocculated in the second flocculation tank 122, and dosing carbon dioxide to the second flocculation tank 122 to adjust pH (122S); producing a third flocculated material in which the first flocculated material and the second flocculated material in second outflow water introduced from the second flocculation tank 122 are flocculated in the third flocculation tank 123 (123S); and solid-liquid separating third outflow water introduced from the third flocculation tank 123 into first sludge containing a third flocculated material and first supernatant water in the first sedimentation tank 124 (124S).

To the first flocculation tank 121, waste water containing fluorine and nitrogen may be introduced from the waste water storage part 110 of FIG. 1 through an inlet ILL In the first flocculation tank 121, a first flocculant 21 may be dosed to produce the first flocculated material in which fluorine in the waste water is coagulated. For example, in the first flocculation tank 121, a water-insoluble calcium salt in which fluorine in the waste water is coagulated may be produced. The first flocculant 21 may include a water-soluble calcium salt. The water-soluble calcium salt may include at least one of chemicals which are dissolved in water to provide a calcium ion ($Ca^{2+}$), like calcium hydroxide ($Ca(OH)_2$), slaked lime), calcium chloride ($CaCl_2$)), calcium oxide ($CaO$), calcium carbide ($CaC_2$), calcium nitrate ($Ca(NO)_3$), and calcium sulfate ($Ca(SO)_4$).

For example, when the water-soluble calcium salt is calcium hydroxide, a chemical reaction such as that of [Chemical Formula 1] may occur in the first flocculation tank 121. That is, when the water-soluble calcium salt is calcium hydroxide, a water-insoluble calcium salt may be formed such as calcium fluoride ($CaF_2$).

$$Ca(OH)_2+2F^-+2H^+\rightarrow CaF_2+2H_2O \quad \text{[Chemical Formula 1]}$$

According to an exemplary embodiment, a fluorine sensor which measures a fluorine concentration may be provided in the first flocculation tank 121. A supplied amount of the water-soluble calcium salt (e.g., calcium hydroxide) may be adjusted according to the concentration value of fluorine measured by a fluorine sensor. The supplied amount of the water-soluble calcium salt (e.g., calcium hydroxide) may be adjusted considering the equivalent of [Chemical Formula 1].

According to an exemplary embodiment, a pH sensor which measures pH may be provided in the first flocculation tank 121. A supplied amount of the water-soluble calcium salt (e.g., calcium hydroxide) may be adjusted according to the pH value measured by the pH sensor. As an example, the supplied amount of the water-soluble calcium salt (e.g., calcium hydroxide) may be adjusted considering the equivalent of [Chemical Formula 1] so that the pH in the first flocculation tank 121 is not excessively increased, but is not limited thereto.

Even after the chemical reaction of [Chemical Formula 1] is finished, a fluorine ion in the first flocculation tank 121 may remain at a low concentration (e.g., about 50 ppm (wt) or less) due to the solubility of calcium fluoride in the solution. Therefore, residual fluorine may be further removed by dosing a second flocculant 22 in the second flocculation tank 122.

To the second flocculation tank 122, first outflow water flowing out from the first flocculation tank 121 may be introduced. To the second flocculation tank 122, the second flocculant 22 is provided, so that a second flocculated material in which the first flocculated material and/or residual fluorine in the first outflow water is/are flocculated may be produced.

For example, in the second flocculation tank 122, a water-insoluble aluminum salt in which the first flocculated material and/or residual fluorine is/are flocculated may be produced. The second flocculant 22 may include a water-soluble aluminum salt. The water-soluble aluminum salt may include at least one of chemicals which are dissolved in water and provide an aluminum ion ($Al^{3+}$), such as aluminum chloride ($AlCl_3$), alum, sodium aluminate ($NaAlO_2$), aluminum hydroxide ($Al(OH)_3$), aluminum oxide ($Al_2O_3$), ammonium alum ($Al(NH_4)(SO_4)_2 12H_2O$), aluminum sulfate ($Al_2(SO_4)_3$), or polyaluminum chloride (PAC).

For example, when the water-soluble aluminum salt is sodium aluminate and/or aluminum chloride, a chemical reaction such as that of [Chemical Formula 2] may occur in the second flocculation tank 122. That is, when the water-soluble aluminum salt is sodium aluminate and/or aluminum chloride (forming $Al^{3+}$ when dissolved in water), a water-insoluble aluminum salt may result such as sodium hexafluoroaluminate ($Na_3AlF_6$). In the second flocculation tank 122, the concentration of a fluorine ion remaining at a low concentration in the first outflow water may be decreased by a chemical reaction as in [Chemical Formula 2]. In the second flocculation tank 122, at least some aluminum salts that are not soluble in water may have a nature of adsorbing a water-insoluble calcium salt and residual fluorine. For example, calcium fluoride or a fluorine ion in the first outflow water is adsorbed to the at least some aluminum salts to undergo coprecipitation, by the chemical reaction such as that of [Chemical Formula 3].

$$Al^{3+}+6F^-+3Na^+\rightarrow Na_3AlF_6 \quad \text{[Chemical Formula 2]}$$

$$Al(OH)_3+nF^-\rightarrow Al(OH)_3\cdot nF \quad \text{[Chemical Formula 3]}$$

According to an exemplary embodiment, a fluorine sensor may be provided in the second flocculation tank 122. The supplied amount of the water-soluble aluminum salt (e.g., aluminum chloride) may be adjusted according to the concentration value of fluorine measured by a fluorine sensor. The supplied amount of the water-soluble aluminum salt (e.g., aluminum chloride) may be adjusted considering the equivalent of [Chemical Formula 2].

In addition, to the second flocculation tank 122, a pH adjusting material 25 may be dosed. In the present disclosure, the usage of hazardous chemicals (e.g., sulfuric acid, hydrochloric acid, and the like) as the pH adjusting material may be reduced by supplying carbon dioxide as the pH adjusting material 25. Therefore, to the flocculation and sedimentation part 120 according to exemplary embodiments in the present disclosure, the pH adjusting material except for carbon dioxide, for example, sulfuric acid, hydrochloric acid, and the like may not be dosed.

The supplied amount of the pH adjusting material 25 may be adjusted according to the pH value in the second reaction tank 22. For example, when pH in the second flocculation tank 122 is excessively increased by the water-soluble aluminum salt (e.g., aluminum chloride), the coprecipitation efficiency of a residual fluorine ion may be lowered. Therefore, the supplied amount of the pH adjusting material 25 (e.g., carbon dioxide) is adjusted so that pH in the second flocculation tank 122 is maintained in a range of about 6 to 8, and thus, the solubility of $CaF_2$ is decreased and the zeta potential of particles approaches zero to minimize interparticle repulsion, thereby forming giant particles of floc and improving the coprecipitation efficiency of residual fluorine. The pH adjusting material 25 may be dosed in a liquid or gas form. For example, the pH adjusting material 25 may be dosed as liquefied or vaporized carbon dioxide ($CO_2$) or as liquefied or vaporized carbonic acid ($H_2CO_3$).

To the third flocculation tank 123, second outflow water flowing out from the second flocculation tank 122 may be introduced. To the third flocculation tank 123, the third flocculant 23 is provided, so that a third flocculated material in which the first flocculated material and the second flocculated material in the second outflow water are flocculated may be produced.

For example, in the third flocculation tank 123, floc in which the first flocculated material and the second flocculated material are flocculated by the third flocculant 23 may be produced. The third flocculant 23 may include a polymer flocculant. The polymer flocculant may include partial hydrolysates of anionic polyacrylamide, sodium alginate, sodium polyacrylate, a maleate copolymer, and polyacrylamide, or combinations thereof.

To the first sedimentation tank 124, third outflow water flowing out from the third flocculation tank 123 may be introduced. In the first sedimentation tank 124, the third outflow water may be solid-liquid separated into first sludge containing the third flocculated material and first supernatant water. The first sludge may include a water-insoluble calcium salt and a water-insoluble aluminum salt produced in the first flocculation tank 121 and the second flocculation tank 122. The first sludge may be discharged through a first outlet OL1, or may be transferred to a sludge storage part and post-treated. The first supernatant water may be transferred to the biological reaction part 130 of FIG. 1 through a second outlet OL2. The first supernatant water may have a fluorine concentration of about 30 mg/L or less, about 20 mg/L or less, or about 10 mg/L or less and a suspended solid (SS) concentration of about 40 mg/L or less, about 30 mg/L or less, or about 20 mg/L or less.

Hereinafter, referring to FIGS. 5 to 9 together, an effect of adjusting pH and an effect of removing fluorine are described according to the waste water treatment process of an exemplary embodiment.

Experimental Example 1

The waste water treatment process of FIG. 4 was performed on waste water having a pH in a range of 3.5 to 4, a fluorine concentration of about 420 ppm or less, and a T-N concentration of about 120 ppm or less, while sulfuric acid ($H_2SO_4$) was dosed before a first base date (BD1), and carbon dioxide ($CO_2$) was dosed from the first base date (BD1). The supplied amount of sulfuric acid ($H_2SO_4$) was adjusted so that the pH of the second flocculation tank 122 was within a range of about 6 to about 8. The supplied amount of carbon dioxide ($CO_2$) was adjusted so that the pH of the second flocculation tank 122 was within a range of about 6 to about 8. Carbon dioxide ($CO_2$) was dosed into the second flocculation tank 122 by vaporizing liquefied carbonic acid.

Figure 5:
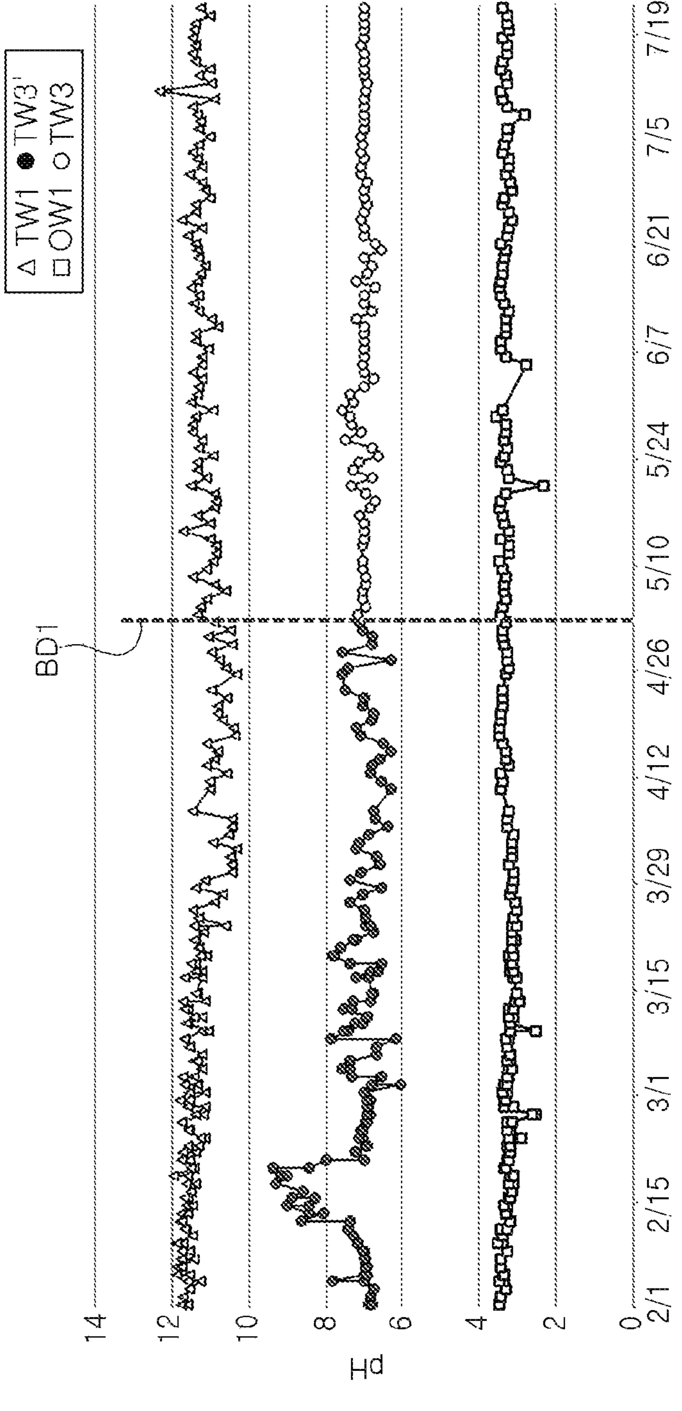
FIG. 5 is a graph showing a pH change with the dosing of sulfuric acid or carbon dioxide, when a waste water treatment process proceeded according to the process of FIG. 4.

At this time, the pH changes in each of the waste water (or original water), the first flocculation tank 121, and the third flocculation tank 123 were measured and are shown in the graph of FIG. 5.

Figure 6:
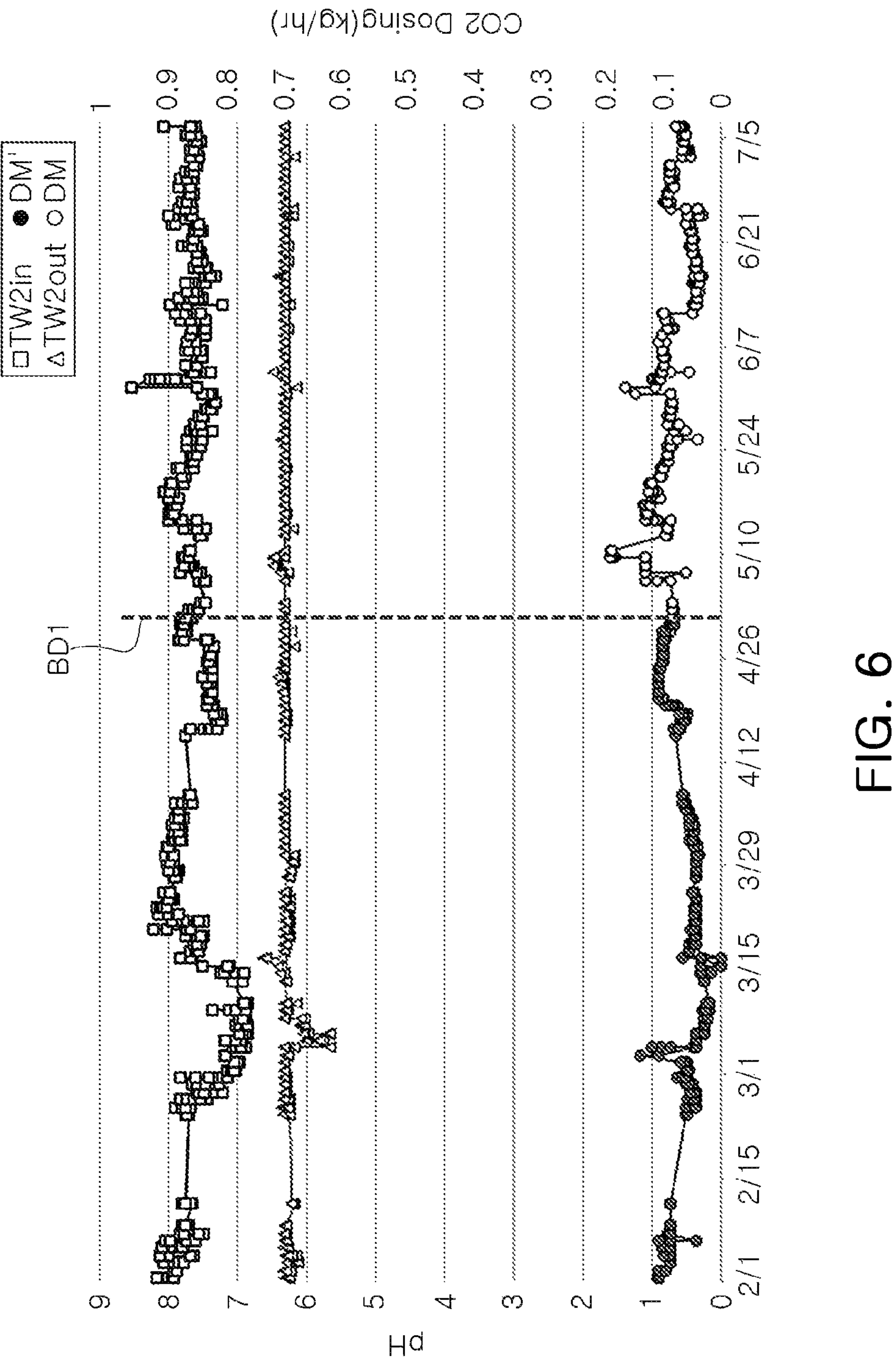
FIG. 6 is a graph showing a pH change depending on a supplied amount of sulfuric acid or carbon dioxide, when a waste water treatment process proceeded according to the process of FIG. 4.

In addition, the pH change in the second flocculation tank 122 depending on the supplied amount of sulfuric acid ($H_2SO_4$) and carbon dioxide ($CO_2$) dosed to the second flocculation tank 122 was measured and is shown in the graph of FIG. 6.

Figure 7:
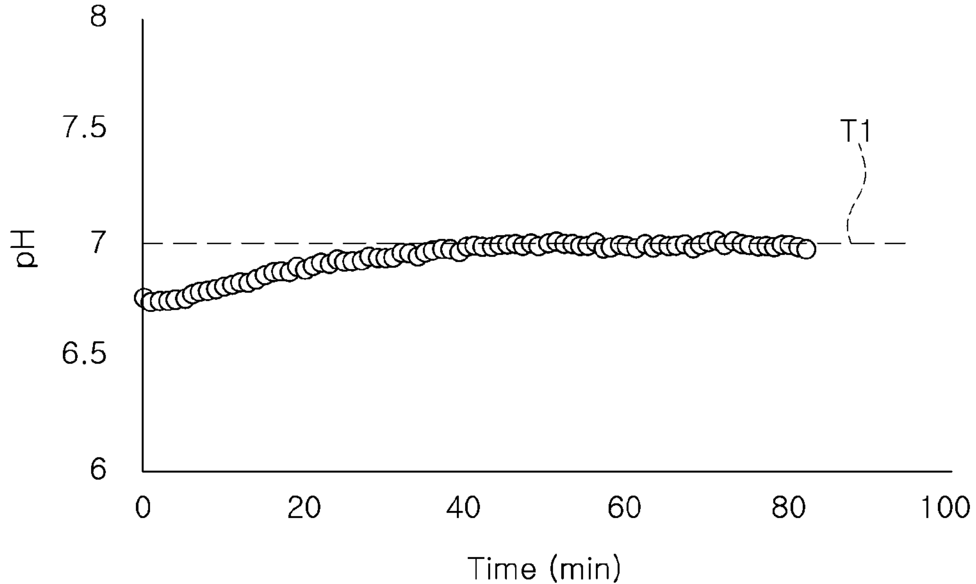
FIG. 7 is a graph showing a pH change in a reaction tank over time after adjusting a supplied amount of carbon dioxide.

In addition, the pH change depending on the adjustment of the supplied amount of carbon dioxide in the second flocculation tank 122 is shown in the graph of FIG. 7 (conditions of adjusting the supplied amount of carbon dioxide: pH 6.7 or less, $CO_2$ dosing: 0.05 to 0.1 kg/hr).

Figure 8:
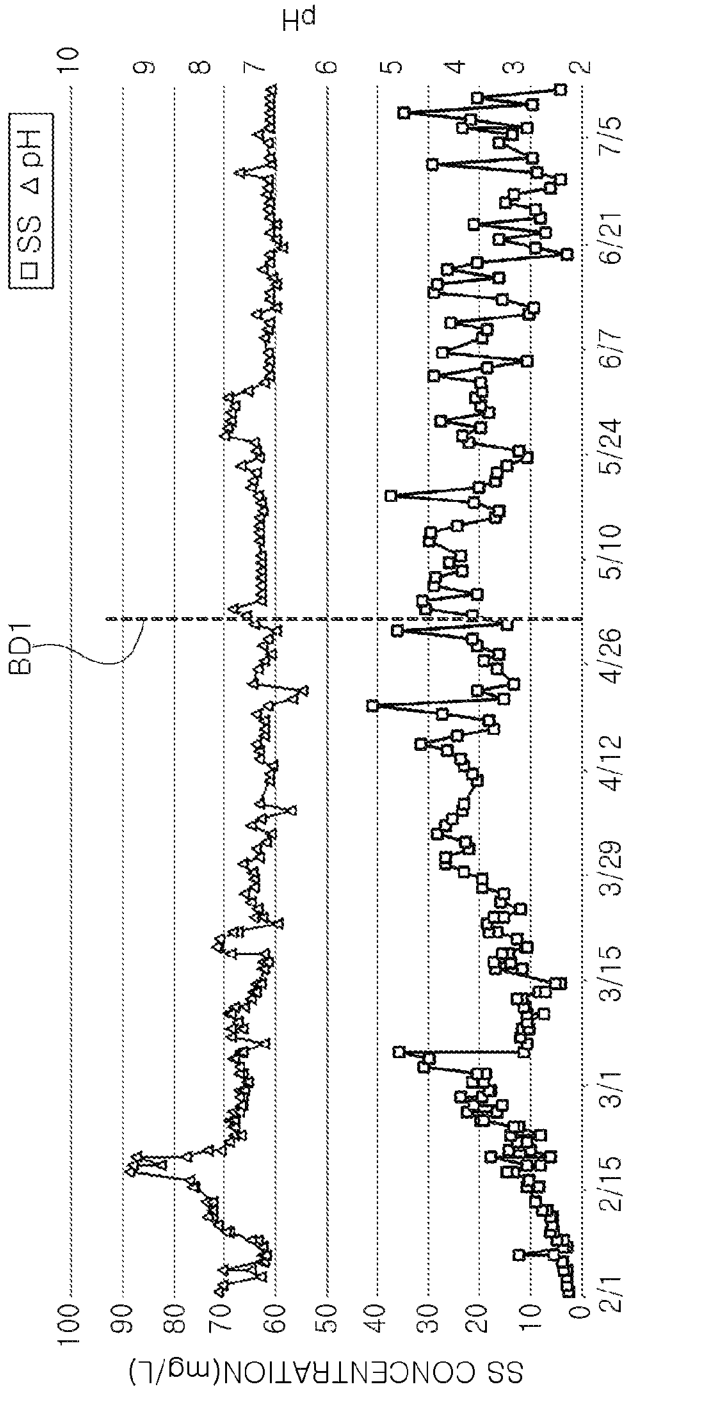
FIG. 8 is a graph showing a suspended solid (SS) concentration and a pH change before and after dosing carbon dioxide, when a waste water treatment process proceeded according to the process of FIG. 4.

In addition, a change in the SS concentration and the pH change of the first supernatant water in the first sedimentation tank 124 are shown in the graph of FIG. 8.

FIG. 5 is a graph showing a pH change with the dosing of sulfuric acid or carbon dioxide, when a waste water treatment process proceeded according to the process of FIG. 4. FIG. 5 shows the pH (OW1) of original water, the pH (TW1) in the first flocculation tank 121, the pH (TW3') in the third flocculation tank 123 before the first base date (BD1), and the pH (TW3) in the third flocculation tank 123 from the first base date (BD1).

Referring to FIG. 5, the pH (OW1) of original water was within a range of about 3 to about 5, and the pH (TW1) in the first flocculation tank 121 was shown in a range of about 10 to about 12. As a result of dosing sulfuric acid or carbon dioxide to the second flocculation tank 122, the pH (TW3' or TW3) of the third flocculation tank 123 was adjusted to a range of about 6 to about 8. That is, as a result of dosing carbon dioxide instead of sulfuric acid from the first base date (BD1), it was found that the pH (TW3') in the third flocculation tank 123 before the first base date (BD1) and the pH (TW3) in the third flocculation tank 123 after the first base date (BD1) were maintained in similar ranges (about 6 to about 8). Therefore, by replacing sulfuric acid with carbon dioxide, hazardous chemicals may be excluded and the pH may be effectively adjusted.

FIG. 6 is a graph showing a pH change depending on a supplied amount of sulfuric acid or carbon dioxide, when a waste water treatment process proceeded according to the process of FIG. 4. FIG. 6 shows the pH (TW2in) of outflow water introduced to the second flocculation tank 122, the pH (Tw2out) of outflow water flowing out from the second flocculation tank 122, the supplied amount (DM') of sulfuric acid before the first base date (BD1), and the supplied amount (DM) of carbon dioxide from the first base date (BD1).

Referring to FIG. 6, the pH (TW2in) of the outflow water of the second flocculation tank 122 was in a range of about 7 to about 9, and the pH (Tw2out) of outflow water of the second flocculation tank 122 was in a range of about 6 to about 8. The supplied amount (DM') of sulfuric acid before the first base date (BD1) was in a range of about 0.001 kg/hr to about 0.4 kg/hr, and the supplied amount (DM) of carbon dioxide from the first base date (BD1) was in a range of about 0.001 kg/hr to about 0.2 kg/hr. Carbon dioxide may effectively adjust the pH of the second flocculation tank 122 with a similar supplied amount (DM) to that of sulfuric acid.

FIG. 7 is a graph showing a pH change in a reaction tank over time after adjusting a supplied amount of carbon dioxide.

Referring to FIG. 7, the supplied amount of carbon dioxide was adjusted by a control system, and then the pH in the reaction tank was restored closely to the target pH (T1) (about 7) within about 30 minutes. That is, when a carbon dioxide concentration or the pH of the reaction tank were out of target conditions, the supplied amount of carbon dioxide was properly adjusted by an automatic control system, thereby stably controlling the pH in the second reaction tank 122.

Figure 9:
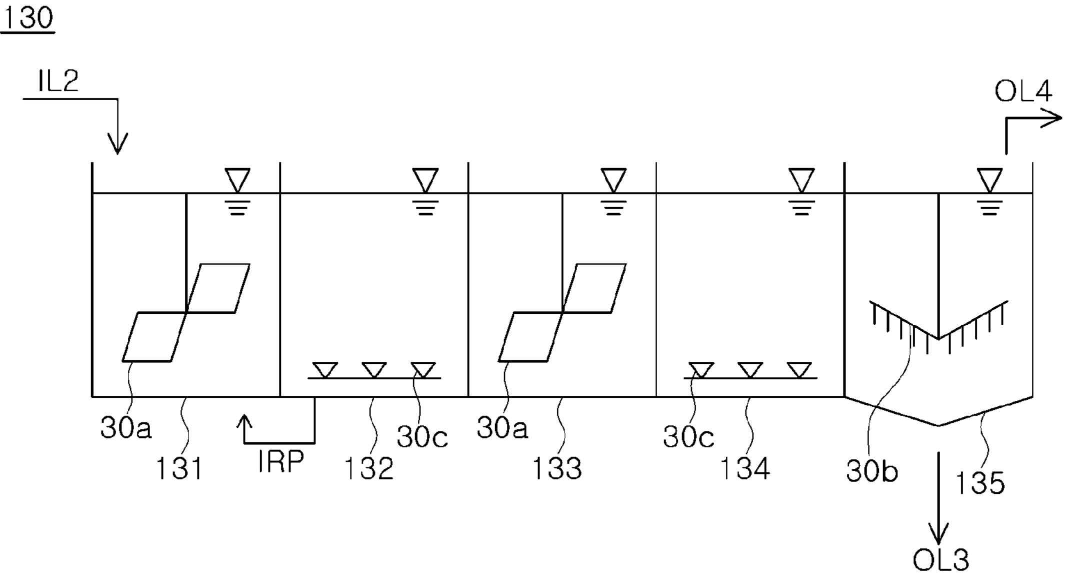
FIG. 9 is a drawing schematically illustrating a biological reaction part according to an exemplary embodiment in the present disclosure.

FIG. 8 is a graph showing a suspended solid (SS) concentration and a pH change before and after dosing carbon dioxide, when a waste water treatment process proceeded according to the process of FIG. 4. FIG. 9 shows a SS concentration (SS') and pH (pH') for the first supernatant water in the first sedimentation tank 124.

Referring to FIG. 8, the SS concentration (SS') of the solid-liquid separated first supernatant water was about 40 mg/L or less, about 30 mg/L or less, or about 20 mg/L or less, and the pH (pH') of the first supernatant water was in a range of about 6 to 8. In addition, though not shown in the drawing, the fluorine concentration in the first supernatant water was about 30 mg/L or less. It was found that the SS concentration (SS') and the pH (pH') were stably maintained before and after the first base date (BD1) when sulfuric acid used as the pH adjusting agent was replaced with carbon dioxide. As described above, in the present disclosure, hazardous chemicals may be decreased using carbon dioxide and the pH of the flocculation and sedimentation part 120 may be effectively adjusted. In addition, carbon dioxide dosed to the flocculation and sedimentation part 120 provides alkalinity to the biological reaction part 130 which is continuously performed later, thereby reducing or excluding the use of hazardous chemicals such as caustic soda.

Hereinafter, referring to FIGS. 9 and 10, the biological reaction part 130 according to an exemplary embodiment in the present disclosure and a nitrogen treatment process using the same will be described in more detail.

Figure 10:
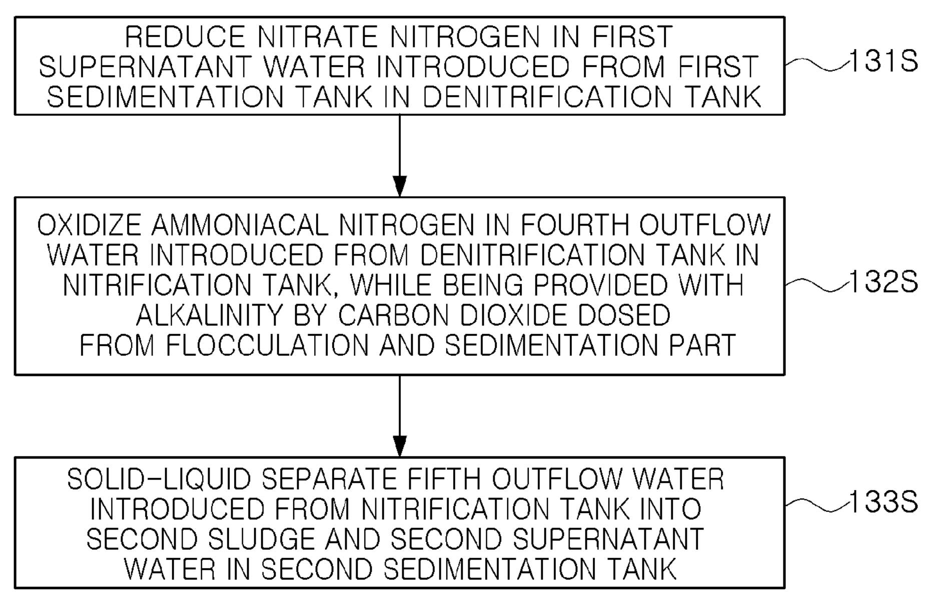
FIG. 10 is a flow chart schematically illustrating a waste water treatment process using the biological reaction part of FIG. 9.

FIG. 9 is a drawing schematically illustrating the biological reaction part 130 according to an exemplary embodiment in the present disclosure, and FIG. 10 is a flow chart schematically illustrating a waste water treatment process 130S using the biological reaction part 130 of FIG. 9.

Referring to FIGS. 9 and 10, the biological reaction part 130 of an exemplary embodiment may include at least one denitrification tank 131 or 133, at least one nitrification tank 132 or 134, and a second sedimentation tank 135. According to an exemplary embodiment, an agitator 30*a* is provided in the at least one denitrification tank 131 or 133, an oxygen supplier 30*c* may be provided in the at least one nitrification tank 132 or 134, and a sludge collector 30*b* may be provided in the second sedimentation tank 135.

In addition, the waste water treatment process (130S) using the biological reaction part 130 of an exemplary embodiment may include: reducing nitrate nitrogen in the first supernatant water introduced from the first sedimentation tank (124' of FIG. 3) in the denitrification tank 131 or 133 (131S); oxidizing ammoniacal nitrogen in fourth outflow water introduced from the denitrification tank 131 or 133 in the nitrification tank 132 or 134 (132S); and solid-liquid separating fifth outflow water introduced from the nitrification tank 132 or 134 into second sludge and second supernatant water in the second sedimentation tank 135 (133S). In addition, the oxidizing of ammoniacal nitrogen (132S) may be provided with alkalinity by carbon dioxide dosed in the adjusting of pH (122S) of FIG. 4.

In an exemplary embodiment, the at least one denitrification tank 131 or 133 may include a first denitrification tank 131 and a second denitrification tank 133, and the at least one nitrification tank 132 or 134 may include a first nitrification tank 132 and a second nitrification tank 134. Hereinafter, description will be made based on two denitrification tanks 131 and 133 and two nitrification tanks 132 and 134 which are alternately disposed, but the biological reaction part 130 which may be applied to the present disclosure is not limited to the number or the order of the denitrification tanks 131 and 133 and the nitrification tanks 132 and 134 illustrated in the drawing. For example, the biological reaction part 130 may include biological reaction tanks combined by AO method, A2O method, Bardenpho method, and the like.

To the first denitrification tank 131, waste water including nitrate nitrogen may be introduced through an inlet IL2. The "waste water" may be provided from the flocculation and sedimentation part 120 of FIG. 3. For example, to the first denitrification tank 131, first supernatant water which has been solid-liquid separated in the first sedimentation tank 124 may be introduced. In the first denitrification tank 131, a denitrification reaction in which nitrate nitrogen is reduced to nitrogen gas by denitrifying microorganisms may proceed. Since the denitrification reaction proceeds under anaerobic conditions, an external carbon source for accelerating the denitrification reaction may be dosed to the first denitrification tank 131. The denitrifying microorganism may include one or more denitrifying bacterium selected from the group consisting of *Pseudomonas, Bacillus, Spirillum, Hyphomicrobium, Agrobacterium, Acinetobacter, Propionibacterium, Rhizobium, Corynebacterium, Cytophaga, Thiobacillus, Alcaligenes, Pseudomonas fluorescens, P. Aeruginosa, P. denitrificans, Alcaligenes* sp., *Curvibacter delicatus, Acidovorax defluvii, Dokdonella koreensis, Dokdonella koreensis, Flavobacterium limicola, Terrimonas ferruginea*, and *Terrimonas lutea*.

To the first nitrification tank 132, fourth outflow water introduced from the first denitrification tank 131, that is, primarily denitrified waste water may be introduced. According to an exemplary embodiment, to the first nitrification tank 132, the first supernatant water which has been solid-liquid separated in the first sedimentation tank 124 may be introduced. In the first nitrification tank 132, a nitrification reaction in which the ammoniacal nitrogen in the fourth outflow water or the first supernatant water is oxidized by nitrifying microorganisms may proceed. Since the nitrification reaction proceeds under aerobic conditions, an oxygen supplier or a blower 30*c* for accelerating a nitrification reaction may be disposed in the first nitrification tank 132. The nitrifying microorganism may include ammonia oxidizing bacterium and nitrite oxidizing bacterium, for example, one or more nitrifying bacterium selected from the group consisting of *Nitrosomonas, Nitrosococcus, Nitrobacter, Nitrococcus, Nitrospira*, and *Nitrospina*. At least a part of active sludge in the first nitrification tank 132 may be returned to the first denitrification tank 131 through an internal return path (IRP).

The first nitrification tank 132 may be provided with alkalinity from a carbonate ($CO_3^{2-}$) contained in the fourth outflow water. The carbonate ($CO_3^{2-}$) contained in the fourth outflow water may be produced by the reaction of [Chemical Formula 4] in a fluorine removal process of the flocculation and sedimentation part 120 described above. According to the present disclosure, since the alkalinity required for the biological reaction part 130 is provided from carbon dioxide dosed to the flocculation and sedimentation part 120, the use of an alkaline material dosed to the biological reaction part, for example, caustic soda (NaOH) may be reduced or excluded. As an example, the alkalinity in the first nitrification tank 132 may be in a range of about 80 mg/L as $CaCO_3$ to about 150 mg/L as $CaCO_3$, about 90 mg/L as $CaCO_3$ to about 150 mg/L as $CaCO_3$, or about 100 mg/L as $CaCO_3$ to about 150 mg/L as $CaCO_3$.

$$CO_2+H_2O \rightarrow 2H^+ + CO_3^{2-} \quad \text{[Chemical Formula 4]}$$

To the second denitrification tank 133, outflow water which underwent a nitrification reaction in the first nitrification tank 132 may be introduced. As an example, the first denitrification tank 131 may be referred to as a pre-denitrification tank, and the second denitrification tank 133 may be referred to as a post-denitrification tank. In the second denitrification tank 133, a denitrification reaction by denitrifying microorganisms and an external carbon source may proceed, similarly to the first denitrification tank 131.

To the second nitrification tank 134, outflow water which has been post-denitrified in the second denitrification tank 133 may be introduced. As an example, the first nitrification tank 132 may be referred to as an aeration tank, and the second nitrification tank 134 may be referred to as a reaeration tank. In the second nitrification tank 134, nitrogen gas produced in the second denitrification tank 133 may be degassed to improve sedimentation in the second sedimentation tank 135 and oxidize residual ammoniacal nitrogen, other organic matters, or the like.

To the second sedimentation tank 135, fifth outflow water flowing out from the second nitrification tank 134 may be introduced. In the second sedimentation tank 135, the fifth outflow water may be solid-liquid separated into second sludge and second supernatant water. The settled second sludge may be discharged as solid waste through a third outlet OL3, or may be returned to the first and second denitrification tanks 131 and 133 or the nitrification tanks 132 and 134 for maintaining a microorganism concentration. The second supernatant water may be discharged to the outside through a fourth outlet OL4. The total nitrogen (T-N) concentration of the second supernatant water may be about 40 mg/L or less or about 30 mg/L or less.

Hereinafter, referring to FIGS. 11 and 12 together, an alkalinity reinforcement effect and a nitrogen removal effect by the waste water treatment process of an exemplary embodiment will be described in detail.

Experimental Example 2

The waste water treatment process of FIG. 10 was performed on the first supernatant water of Experimental Example 1, while caustic soda (NaOH) was dosed before the second base date (BD2), and the dosing of the caustic soda (NaOH) was stopped from the second base date (BD2).

Figure 11:
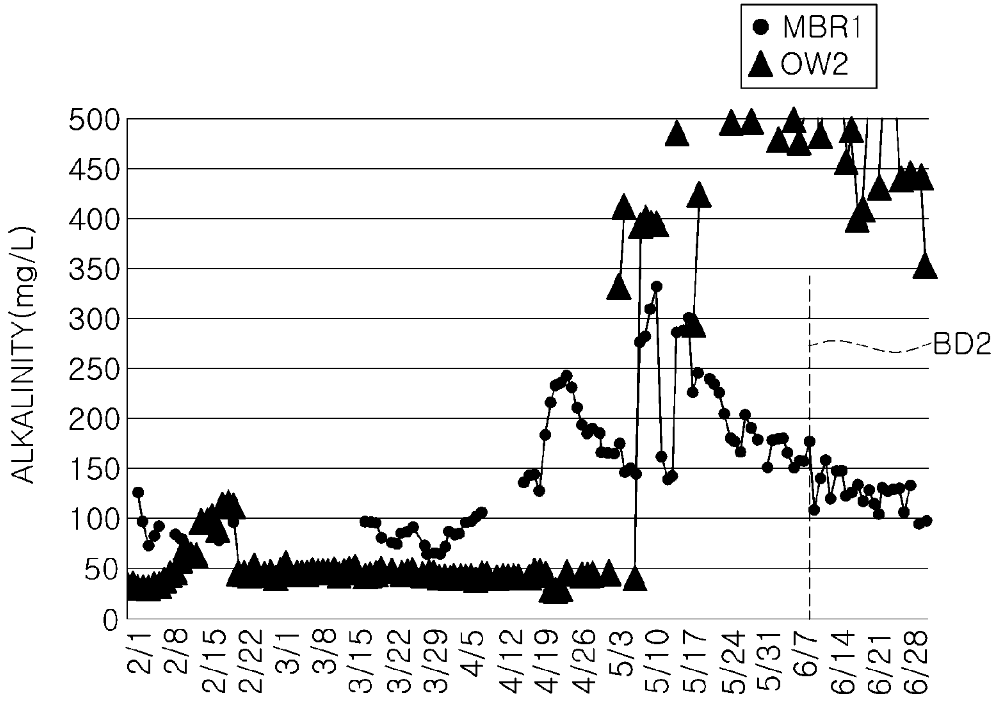
FIG. 11 is a graph showing alkalinity change depending on whether caustic soda was dosed, when the waste water treatment process proceeded according to the process of FIG. 10.

At this time, the changes in the alkalinity of the first supernatant water introduced to the first denitrification tank 131 and the second supernatant water which had been solid-liquid separated in the second sedimentation tank 135 were measured and are shown in the graph of FIG. 11.

Figure 12:
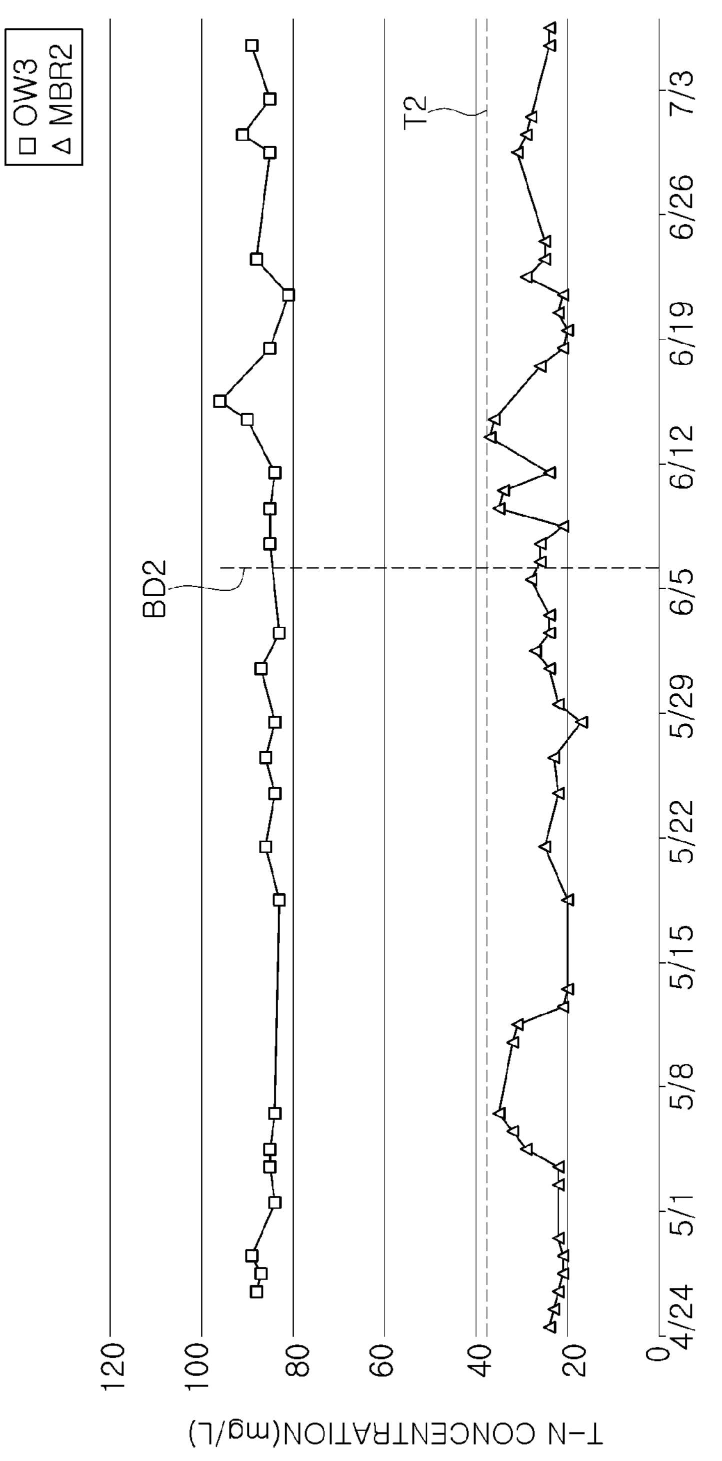
FIG. 12 is a graph showing a change in a total nitrogen (T-N) concentration depending on whether caustic soda was dosed, when the waste water treatment process proceeded according to the process of FIG. 10.

In addition, the changes in the total nitrogen (T-N) concentration of the first supernatant water introduced to the first denitrification tank 131 and the second supernatant water which had been solid-liquid separated in the second sedimentation tank 135 were measured and are shown in the graph of FIG. 12.

FIG. 11 is a graph showing an alkalinity change of the second sedimentation tank depending on whether caustic soda was dosed, when the waste water treatment process proceeded according to the process of FIG. 10. FIG. 11 shows the alkalinity (OW2) of the first supernatant water, and the alkalinity (MBR1) of the second supernatant water.

Referring to FIG. 11, the alkalinity (OW2) of the first supernatant water rose sharply from the first base date (about May 1st) ('BD1' of FIG. 5) when carbon dioxide was dosed in Experimental Example 1. This is understood as being due to the fact that a carbonate supplied by carbon dioxide and a hydroxide ion supplied by caustic soda coexisted in the first supernatant water.

The alkalinity (OW2) of the first supernatant water and the alkalinity (MBR1) of the second supernatant water were both decreased after the second base date (BD2) when the dosing of caustic soda was stopped. As an example, the alkalinity (MBR1) of the second supernatant water was decreased to about 150 mg/L or less.

That is, when the previously dosed caustic soda was all replaced with the carbonate of carbon dioxide dosed in the flocculation and sedimentation part 120, it was found that the alkalinity of each of the first supernatant water and the second supernatant water was somewhat decreased. However, it is considered that the alkalinity required for the nitrification reaction was sufficiently supplied by the alkalinity (MBR1) (in a range of about 80 mg/L to about 150 mg/L) of the second supernatant water maintained after the second base date (BD2). This will be described below with reference to FIG. 12.

FIG. 12 is a graph showing a change in the total nitrogen (T-N) concentration of the second sedimentation tank depending on whether caustic soda was dosed, when the waste water treatment process proceeded according to the process of FIG. 10. FIG. 12 shows the total nitrogen (T-N) concentration (OW3) of the first supernatant water and the total nitrogen (T-N) concentration (MBR2) of the second supernatant water.

Referring to FIG. 12, the total nitrogen (T-N) concentration (OW3) of the first supernatant water was in a range of about 80 mg/L to about 100 mg/L, and the total nitrogen (T-N) concentration (MBR2) of the second supernatant water was in a range of about 20 mg/L to about 40 mg/L. Even after the second base date (BD2) when the dosing of caustic soda was stopped, the target concentration (T2) (about 40 mg/L or less) before the second base date (BD2) may be satisfied. That is, when the previously dosed caustic soda was all replaced with the carbonate of carbon dioxide dosed in the flocculation and sedimentation part 120, it was found that the nitrogen removal effect was maintained in spite of the decreased alkalinity. As such, according to the present disclosure, since the alkalinity required for the biological reaction part 130 is provided by carbon dioxide dosed as a pH adjusting material in the flocculation and sedimentation part 120, the use of hazardous materials such as caustic soda (NaOH) may be excluded.

According to exemplary embodiments of the present disclosure, alkalinity required for a biological reaction part is provided by carbon dioxide dosed to a flocculation and sedimentation part, thereby providing an apparatus and a method for treating waste water in which the usage of hazardous chemicals is reduced.

The present disclosure is not limited to the above-described exemplary embodiments and the accompanying drawings, but is defined by the accompanying claims. Accordingly, various substitution, modifications and alteration may be made within the scope of the present disclosure may be made by those skilled in the art without departing from the spirit of the prevent disclosure defined by the accompanying claims.

What is claimed is:

1. An apparatus for treating waste water comprising:

a first flocculation tank configured to receive a first source of first flocculant to provide a first flocculant to produce a first flocculated material or insoluble material in which fluorine in waste water introduced from a waste water storage area is coagulated or forms an insoluble fluoride;

a second flocculation tank in fluid communication with the first flocculation tank, the second flocculation tank is configured to receive first outflow material from the first flocculation tank and configured to receive a second source of second flocculant to provide a second flocculant and configured to receive a third source of carbon dioxide or carbonic acid to provide carbon dioxide or carbonic acid to the second flocculation tank so as to produce a second flocculated material in which the first flocculated material and residual fluorine in first outflow material introduced from the first flocculation tank are flocculated;

a third flocculation tank in fluid communication with the second flocculation tank configured to receive second outflow material from the second flocculation tank and configured to receive a fourth source of third flocculant to provide a third flocculant to produce a third flocculated material in which the first flocculated material and the second flocculated material in second outflow material introduced from the second flocculation tank are flocculated;

a first sedimentation tank in fluid communication with the third flocculation tank configured to receive third outflow material from the third flocculation tank and which is solid-liquid separated into first sludge containing the third flocculated material and first supernatant liquid;

a nitrification tank in fluid communication with the first sedimentation tank and having therein nitrifying microorganisms and configured to receive alkalinity provided by a carbonate formed from carbon dioxide or carbonic acid supplied in the second flocculation tank, and wherein ammoniacal nitrogen in the first supernatant liquid introduced from the first sedimentation tank is oxidized by nitrifying microorganisms to form fourth outflow material; and a second sedimentation tank in fluid communication with the nitrification tank and in which fourth outflow material from the nitrification tank is solid-liquid separated into second sludge and second supernatant liquid.

2. The apparatus for treating waste water of claim 1, wherein the first flocculant in the first flocculation tank includes a water-soluble calcium salt.

3. The apparatus for treating waste water of claim 2, wherein the water-soluble calcium salt in the first flocculation tank includes at least one of calcium hydroxide ($Ca(OH)_2$, slaked lime), calcium chloride ($CaCl_2$)), calcium oxide (CaO), calcium carbide ($CaC_2$), calcium nitrate ($Ca(NO)_3$), and calcium sulfate ($Ca(SO)_4$).

4. The apparatus for treating waste water of claim 1, wherein the carbon dioxide in the second flocculation tank is dosed in a carbonic acid ($H_2CO_3$) form.

5. The apparatus for treating waste water of claim 1, wherein a supplied amount of the carbon dioxide in the second flocculation tank is adjusted so that a pH of the second outflow material is in a range of about 6 to about 8.

6. The apparatus for treating waste water of claim 1, wherein a supplied amount of the second flocculant in the second flocculation tank is adjusted according to a concentration value of fluorine.

7. The apparatus for treating waste water of claim 1, wherein the second flocculation tank is not provided with sulfuric acid for pH adjustment.

8. The apparatus for treating waste water of claim 1, wherein the second flocculant in the second flocculation tank includes a water-soluble aluminum salt.

9. The apparatus for treating waste water of claim 8, wherein the water-soluble aluminum salt in the second flocculation tank includes at least one of aluminum chloride ($AlCl_3$), alum, sodium aluminate ($NaAlO_2$), aluminum hydroxide ($Al(OH)_3$), aluminum oxide ($Al_2O_3$), ammonium alum ($Al(NH_4)(SO_4)_2 12H_2O$), aluminum sulfate ($Al_2(SO_4)_3$), or poly aluminum chloride (PAC).

10. The apparatus for treating waste water of claim 1, wherein the third flocculant in the third flocculation tank includes a polymer flocculant.

11. The apparatus for treating waste water of claim 10, wherein the polymer flocculant in the third flocculation tank includes partial hydrolysates of anionic polyacrylamide, sodium alginate, sodium polyacrylate, a maleate copolymer, and polyacrylamide, or combinations thereof.

12. The apparatus for treating waste water of claim 1, wherein the first flocculated material in the first flocculation tank includes a water-insoluble calcium salt, the second flocculated material in the second flocculation tank includes a water-insoluble aluminum salt, and the third flocculated material in the third flocculation tank includes floc in which the first flocculated material and the second flocculated material are flocculated by the third flocculant.

13. The apparatus for treating waste water of claim 1, further including a denitrification tank disposed between the nitrification tank and the first sedimentation tank or between the nitrification tank and the second sedimentation tank, and in which the first supernatant liquid introduced from the first sedimentation tank or nitrate nitrogen in fifth outflow material introduced from the nitrification tank is reduced by denitrifying microorganisms.

14. The apparatus for treating waste water of claim 1, wherein the first supernatant liquid from the first sedimentation tank has a fluorine concentration of about 30 mg/L or less and a suspended solid (SS) concentration of about 40 mg/L or less.

15. The apparatus for treating waste water of claim 1, wherein the alkalinity in the nitrification tank is in a range of about 80 mg/L to about 150 mg/L.

16. The apparatus for treating waste water of claim 1, wherein the nitrification tank is not dosed with caustic soda (NaOH) for providing the alkalinity to the nitrification tank.

17. The apparatus for treating waste water of claim 1, wherein the second supernatant liquid from second sedimentation tank has a total nitrogen (T-N) concentration of about 40 mg/L or less.

18. An apparatus for treating waste water comprising:

a first flocculation tank configured to receive a waste water comprising fluorine is introduced and where a water-insoluble calcium salt is produced and flows out in a first outflow water;

a second flocculation tank configured to receive the first outflow water and carbon dioxide from a first source for adjusting a pH of the first outflow water introduced and flows out in a second outflow water;

a third flocculation tank configured to receive the second outflow water and in which floc comprising the water-insoluble calcium salt is produced and flows out in a third outflow water;

a first sedimentation tank configured to receive the third outflow water from the third flocculation tank and which is separated into a first sludge containing the floc and first supernatant water;

a nitrification tank configured to receive the first supernatant water in which ammoniacal nitrogen is oxidized, wherein the nitrification tank is not dosed with an alkaline material for providing alkalinity from an external source, and which flows out as a fourth outflow water, wherein the nitrification tank is provided with alkalinity by a carbonate formed from the carbon dioxide dosed to the second flocculation tank; and a second sedimentation tank configured to receive the fourth outflow water which is separated into a second sludge and second supernatant water.

19. A method for treating waste water, the method comprising:

producing a first flocculated material in which fluorine in waste water is coagulated in a first flocculation tank;

producing a second flocculated material in which residual fluorine in first outflow water introduced from the first flocculation tank is flocculated in a second flocculation tank and adjusting a pH by dosing carbon dioxide to the second flocculation tank;

producing a third flocculated material in which the first flocculated material and the second flocculated material in second outflow water introduced from the second flocculation tank are flocculated, in a third flocculation tank;

solid-liquid separating third outflow water introduced from the third flocculation tank into first sludge containing the third flocculated material and first supernatant water in a first sedimentation tank;

oxidizing ammoniacal nitrogen in the first supernatant water introduced from the first sedimentation tank, in a nitrification tank, alkalinity is provided by a carbonate formed from the carbon dioxide dosed in the adjusting of pH; and solid-liquid separating fourth outflow water introduced from the nitrification tank into second sludge and second supernatant water in a second sedimentation tank.

* * * * *